US010670048B2

(12) United States Patent
Landén et al.

(10) Patent No.: US 10,670,048 B2
(45) Date of Patent: Jun. 2, 2020

(54) BLOWER WITH IMPROVED SOUND REDUCTION (71) Applicant: HUSQVARNA AB, Huskvarna (SE)

(72) Inventors: Göran Landén, Huskvarna (SE);
Tobias Nyberg, Huskvarna (SE);
Fredrik Wibling, Malmbäck (SE);
Christian Bylund, Huskvarna (SE)

(73) Assignee: Husqzarna AB, Huskvarna (DE)

(*) Notice: Subject to any disclaimer, the term of this patent is extended or adjusted under 35 U.S.C. 154(b) by 179 days.

(21) Appl. No.: 15/577,051

(22) PCT Filed: May 28, 2015

(86) PCT No.: PCT/EP2015/061838
§ 371 (c)(1),
(2) Date: Nov. 27, 2017

(87) PCT Pub. No.: WO2016/188583
PCT Pub. Date: Dec. 1, 2016

(65) Prior Publication Data
US 2018/0163750 A1    Jun. 14, 2018

(51) Int. Cl.
*A47L 5/24*    (2006.01)
*F04D 29/66*    (2006.01)
(Continued)

(52) U.S. Cl.
CPC ........... *F04D 29/663* (2013.01); *A01G 20/47* (2018.02); *A47L 5/24* (2013.01); *F04D 25/06* (2013.01); *F04D 25/08* (2013.01); *F04D 29/522* (2013.01)

(58) Field of Classification Search
CPC ..................................... A47L 5/14; A47L 5/24
See application file for complete search history.

(56) References Cited

U.S. PATENT DOCUMENTS 6,003,199 A * 12/1999 Shaffer ................ A47L 5/14
                                                                    15/405
6,105,206 A    8/2000 Tokumaru et al.
(Continued)

FOREIGN PATENT DOCUMENTS

EP    2431529 A2    3/2012
EP    2444552 A1    4/2012
(Continued)

OTHER PUBLICATIONS

International Search Report and Written Opinion for International Application No. PCT/EP2015/061838 dated Feb. 5, 2016, all enclosed pages cited.
(Continued)

*Primary Examiner* — Michael D Jennings
(74) *Attorney, Agent, or Firm* — Burr & Forman LLP (57) ABSTRACT A blower (100) may include a housing (110), a motor (120), a fan assembly (170) and an inlet assembly (160). The housing (110) may include a handle (140) operably coupled thereto. The fan assembly (170) may be operably coupled to the motor (120) to force air through a blower tube (150) responsive to operation of the motor (120). The blower tube (150) may define a tube axis (152). The inlet assembly (160) may provide a path for air to the fan assembly (170). The inlet assembly (160) may include an inlet aperture (162) formed at an end of the housing (110). The inlet assembly (160) may further include an inlet mesh (164) disposed within the housing (110) spaced apart from the inlet aperture (162).

20 Claims, 5 Drawing Sheets (51) Int. Cl.
*F04D 25/06* (2006.01)
*F04D 29/52* (2006.01)
*F04D 25/08* (2006.01)
*A01G 20/47* (2018.01)

(56) References Cited

U.S. PATENT DOCUMENTS

| | | |
|---|---|---|
| 8,479,879 B2 | 7/2013 | Hawwa |
| 8,918,956 B2 | 12/2014 | Pellenc |
| 2003/0066159 A1* | 4/2003 | Sanders ............... A47L 5/14 15/405 |
| 2004/0117940 A1 | 6/2004 | Kim |
| 2007/0246579 A1* | 10/2007 | Blateri ............... A47L 5/14 239/599 |
| 2014/0050600 A1 | 2/2014 | Kodato et al. |
| 2014/0299406 A1* | 10/2014 | Librett ............... F04D 29/665 181/224 |
| 2018/0163750 A1 | 6/2018 | Landen et al. |

FOREIGN PATENT DOCUMENTS

| | | |
|---|---|---|
| EP | 3302024 B1 | 1/2020 |
| JP | H10-73304 A | 3/1998 |
| JP | 2002276491 A | 9/2002 |
| JP | 2004-202185 A | 7/2004 |
| JP | 2014047703 A | 3/2014 |
| JP | 2018-523039 A | 8/2018 |
| WO | 2012010411 A1 | 1/2012 |
| WO | 2014030755 A1 | 2/2014 |
| WO | 2016/188583 A1 | 12/2016 |

OTHER PUBLICATIONS

International Preliminary Report on Patentability for International Application No. PCT/EP2015/061838 dated Nov. 28, 2017, all enclosed pages cited.

* cited by examiner

BLOWER WITH IMPROVED SOUND REDUCTION

TECHNICAL FIELD

Example embodiments generally relate to outdoor power equipment and, more particularly, relate to a structure for reducing the noise generated by power equipment such as a blower.

BACKGROUND

Outdoor power equipment includes such devices as mowers, trimmers, edgers, chainsaws, blowers and the like. These devices are often used to perform tasks that inherently require the devices to be mobile. Accordingly, these devices are typically made to be relatively robust and capable of handling difficult work in hostile environments, while balancing the requirement for mobility.

Powering such devices could be accomplished in any number of ways. However, for outdoor power equipment that is intended to be handheld, size and weight become important considerations. In some applications, the emissions (i.e., in terms of noise and/or pollutants) generated by the device may also become an important consideration. To reduce emissions, such outdoor power equipment may be selected for employment with electric motors that could employ battery or mains power supplies. However, even the fan assemblies of some electric powered outdoor power equipment such as blowers may be capable of generating relatively large amounts of noise.

Although it may always be advisable to wear hearing protection while operating outdoor power equipment, some operators will still operate the equipment without hearing protection. Additionally, the provision of equipment that is quieter can be a very positive marketing incentive as a quieter blower could be operated earlier in the morning or at other times without concern for upsetting neighbors. Thus, to improve operating conditions for operators and for people in the vicinity of working equipment, it may instead be desirable to provide design features that enable the equipment to operate more quietly without sacrificing the power and productivity that consumers expect.

BRIEF SUMMARY OF SOME EXAMPLES

Some example embodiments may therefore provide structures that facilitate a reduction in the noise that is perceptible to operators and others in the vicinity of operating equipment. Moreover, some embodiments may provide improvements without the addition of extra components or structures that may increase the size, cost and/or complexity of outdoor power equipment.

In accordance with an example embodiment, a blower may be provided. The blower may include a housing, a motor, a fan assembly and an inlet assembly. The housing may include a handle operably coupled thereto. The fan assembly may be operably coupled to the motor to force air through a blower tube responsive to operation of the motor. The blower tube may define a tube axis. The inlet assembly may provide a path for air to the fan assembly. The inlet assembly may include an inlet aperture formed at an end of the housing. The inlet assembly may further include an inlet mesh disposed within the housing spaced apart from the inlet aperture.

In another example embodiment, an alternative blower may be provided including the features above and/or including the additional or alternative features described below. In this regard, the blower may include a housing, a motor, and a fan assembly similar to those described above. The housing may include a handle operably coupled thereto. The fan assembly may be operably coupled to the motor to force air through a blower tube responsive to operation of the motor. The blower tube may define a tube axis. The fan assembly may be provided in an outlet tube corresponding to the blower tube, and air may be fed to the fan assembly via an inlet tube spaced apart from the outlet tube such that the outlet tube and inlet tube are operably coupled to each other via an acoustic chamber defined by the housing.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide structures for providing air to the blower in a manner that tends to reduce the noise generated by the blower. In this regard, some example embodiments may provide for the inclusion of inlet vanes that form a portion of an inlet assembly such that the inlet vanes are formed as an inlet mesh that is entirely inset within the housing of the blower to reduce sound emissions and/or direct sound emissions away from the operator. The inlet mesh may also be part of an inlet assembly that feeds into an integrated muffler system, and is incorporated into an inlet aperture that is angled downward. Each of these sound reduction structures (e.g., the integrated muffler, the downward angled inlet aperture, and the inlet mesh that is inset within the housing)

may be employed alone or in combination with each other and/or other structures to reduce noise emissions.

By angling the inlet aperture downward, noise that emanates from the fan assembly of the device is also generally directed downward. Since the operator tends to naturally hold the device at or around waist level (often below waist level), the directing of noise downward by the angled inlet aperture correspondingly directs the noise away from the operators ears and toward the ground. Directing the noise toward the ground may prevent the noise from having a direct path to the operator's ears, but it may also direct the noise to the rough and somewhat sound absorptive terrain below so that noise can be absorbed and/or reflected to reduce overall noise levels in the environment as well. Additionally, by placing the inlet mesh inside the housing, any flow noise over the inlet vanes is also directed through the angled inlet aperture downward toward the ground instead of allowing such flow noise to emanate unabated in all directions. If an integrated muffler is employed, noise generated inside the blower can more effectively be contained and muted therein. The quietness of the blower may therefore be improved without increasing cost and complexity, while still increasing blower reliability and/or performance.

Figure 1:
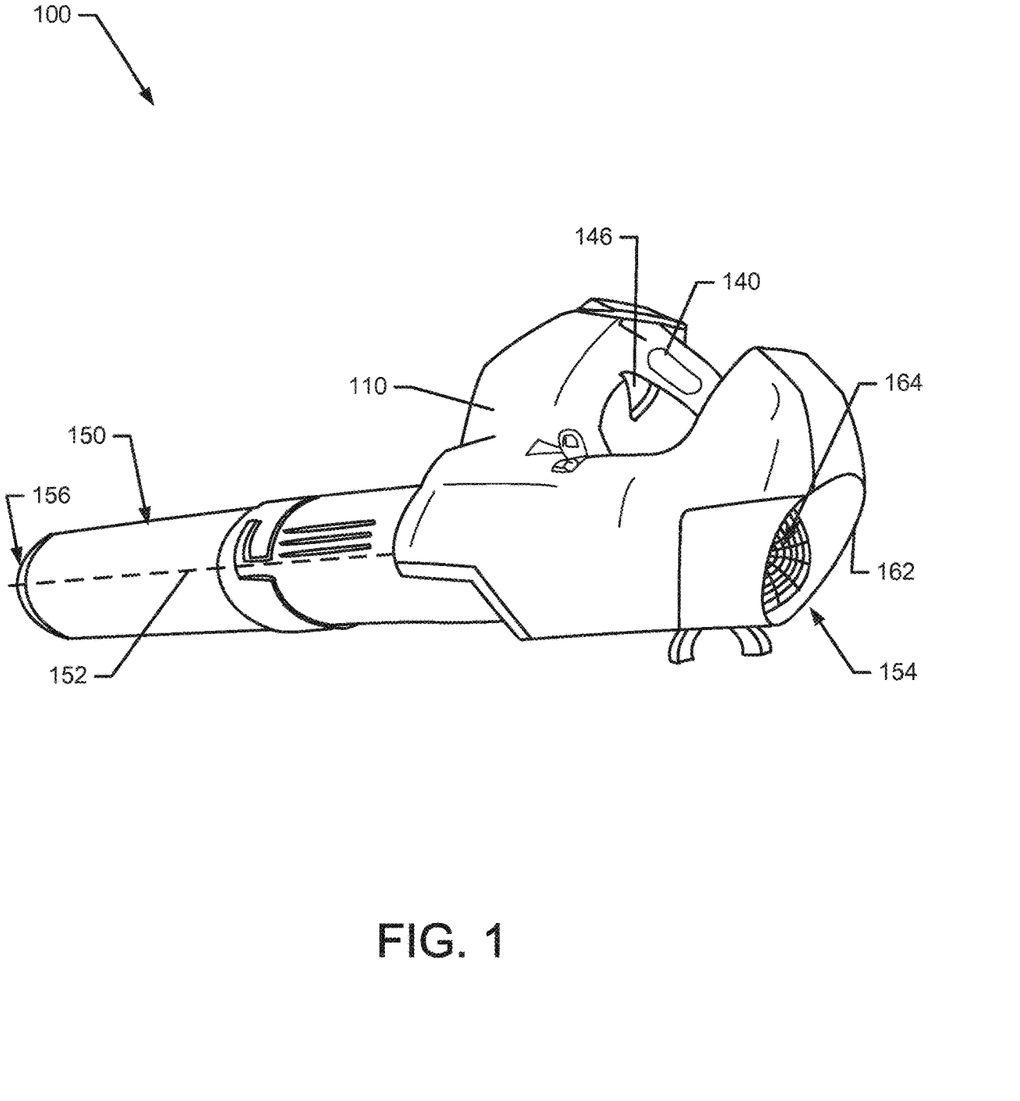
FIG. 1 illustrates a perspective side view of a blower to show some structures for providing noise reduction in accordance with an example embodiment in accordance with an example embodiment.
Figure 2:
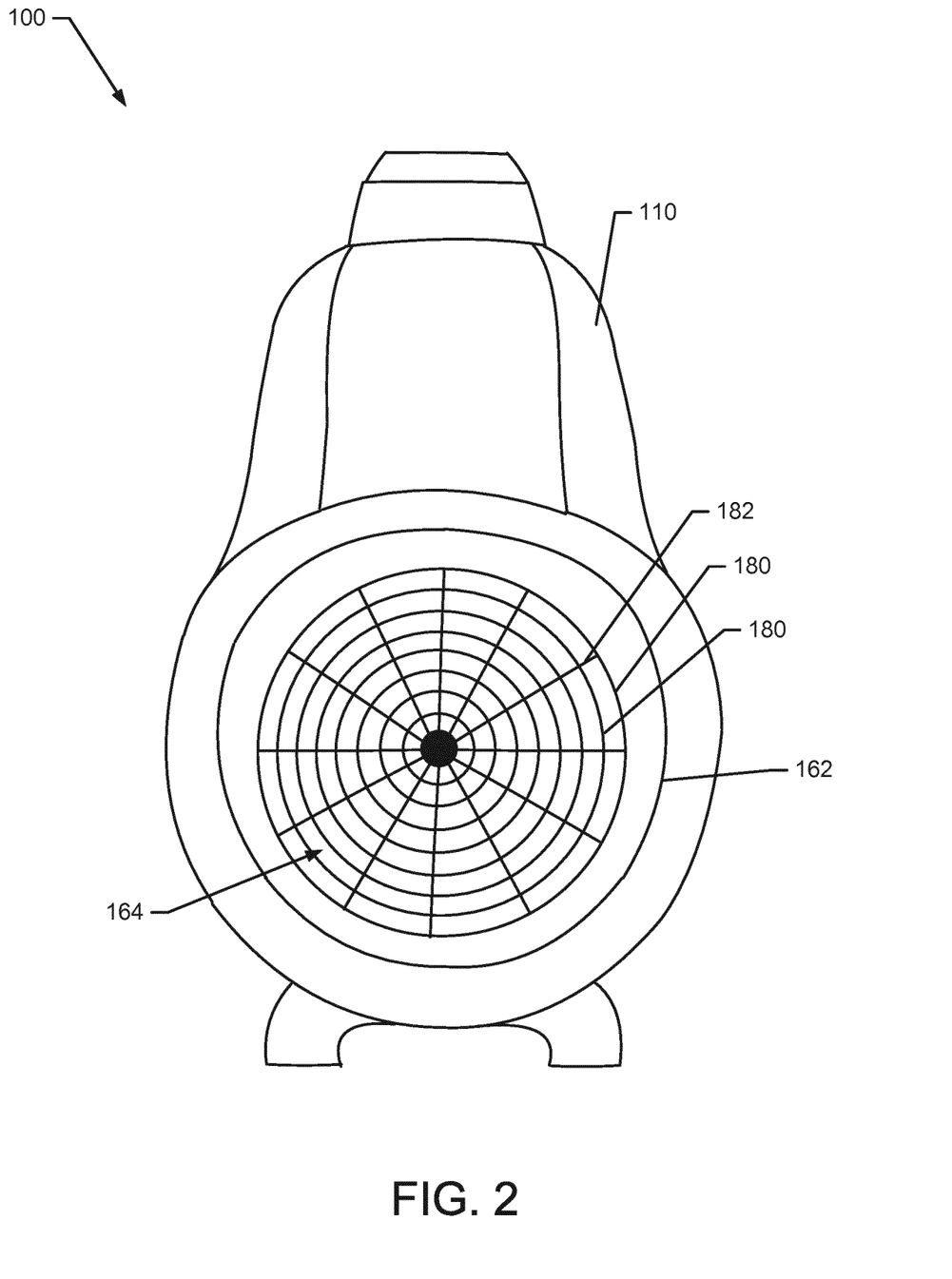
FIG. 2 illustrates a rear view of a blower to illustrate an inlet assembly in accordance with an example embodiment.
Figure 3:
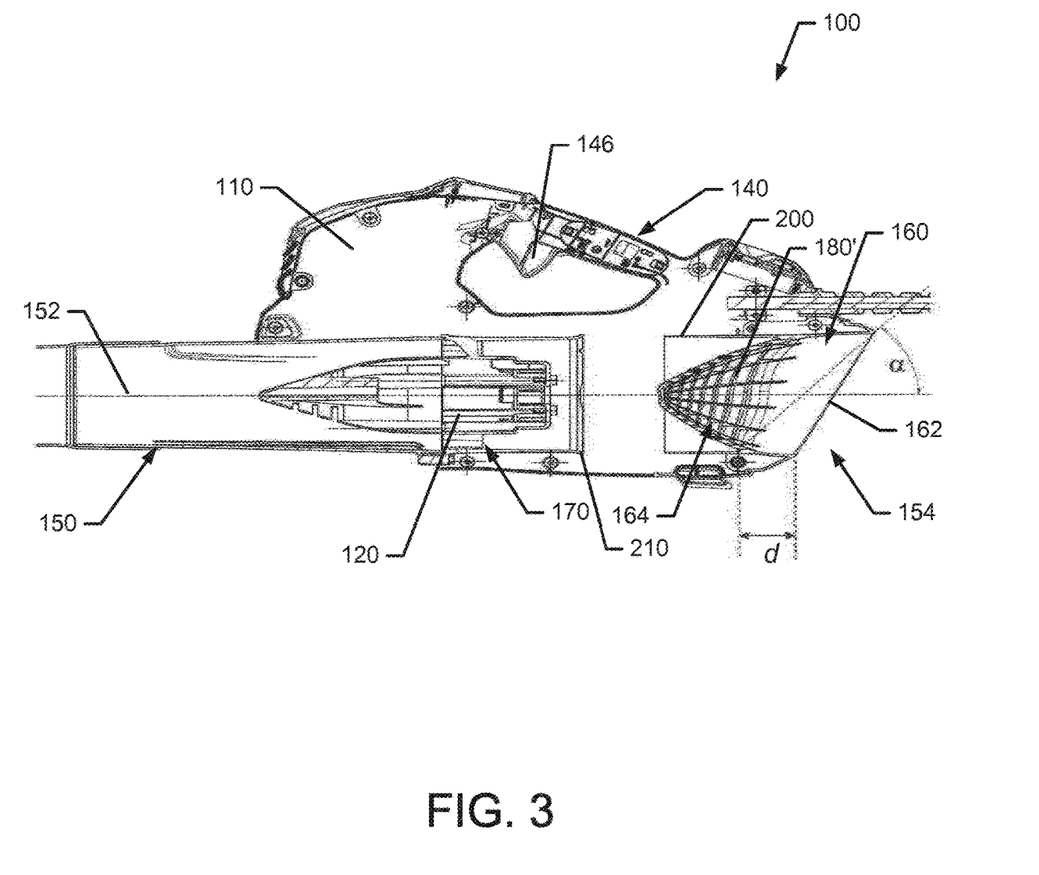
FIG. 3 illustrates a cross section view of the blower in accordance with an example embodiment.

FIG. 1 illustrates a perspective side view of a blower 100 in accordance with an example embodiment. FIG. 2 illustrates a rear view of the blower 100 in accordance with an example embodiment. FIG. 3 illustrates a cross section view of the blower 100 in accordance with an example embodiment. It should be appreciated that the blower 100 of FIGS. 1-3 merely represents one example of power equipment on which an example embodiment may be employed. Referring to FIGS. 1-3, the blower 100 may include a housing 110 inside which various components of the blower 100 are housed. The blower 100 may further include a motor 120 or power unit for providing the driving force to move air through the blower 100. In some embodiments, the power unit may be a three phase electric motor (or DC motor) that is operated under the control of a control unit or control circuitry that may be housed in the housing 110. The motor 120 may be powered by a battery (or battery pack that can be worn on the operator's back) or by a corded connection to mains power.

The housing 110 may be formed of plastic, composite materials, metals or any other desirable materials. In an example embodiment, the housing 110 may be formed of two or more molded pieces that can be fit together. In some cases, the molded pieces may form half-shells (e.g., right and left half-shells) that can be affixed to each other via welding, adhesives, snap fittings, fixing members (e.g., screws), and/or the like. When molded pieces are fit together, they may form a seam at the location of joining between the molded pieces.

In some embodiments, the control unit may be housed in its own portion of the housing 110 above or otherwise proximate to the location of the motor 120. The portion of the housing 110 in which the control unit is housed may be referred to as a control unit housing portion, and the control unit housing portion may be an integral part of a half-shell (as described above) or may be a separate housing portion that is joined to other housing portions. The control unit housing portion may be disposed proximate to a portion of the housing 110 near which a handle 140 of the blower 100 is provided (e.g., forward of the handle 140).

In an example embodiment, the handle 140 may include a trigger 146 that may be operated by a finger of the operator while the operator holds the handle 140. Actuation of the trigger 146 may cause power from the battery or other electric power source to be selectively applied to the motor 120 to turn the motor 120 based on control provided by the control unit. In some cases, the control unit may include interlocks, protective functions or other control mechanisms that may sense various conditions of the blower 100 via sensors, switches or other mechanisms in order to selectively control the application of power to the motor 120 based on indications of user intent (e.g., via actuation of the trigger 146) and/or determinations regarding the state of the blower 100 as provided by the sensors, switches or other mechanisms.

It should be appreciated that although FIG. 1 shows an example in which the trigger 146 is used for selective powering of the motor 120, other example embodiments may employ a selector, switch, button or other such operative member in order to selectively control operation of the motor 120. Thus, for example, on/off, speed control or other operable functions for controlling the motor 120 may be performed using an operative member of any desirable form, and the trigger 146 is just one example.

The blower 100 may further include a blower tube 150 that is attached to housing 110 (or is a part of the housing 110) and through which air may be expelled. The blower tube 150 may define a blower tube axis 152, which defines an axial centerline of the blower tube 150. The blower tube 150 may include an inlet portion 154 and an outlet 156. The outlet 156 may be at a distal end of the blower tube 150 and the inlet portion 154 may be at an opposite end of the housing 110 relative to the blower tube 150, rearward of the motor 120 and the handle 140. Given that the operator typically holds the blower 100 by the handle 140 and the remainder of the blower 100 is suspended below the handle 140 with the outlet 156 aimed in front of the operator, the handle 140 is generally considered to be at a top portion of the blower 100 and the outlet 156 is at the front, while the inlet portion 154 is considered to be at a rear of the blower 100. In some cases, the blower tube 150 may taper slightly (i.e., have a decreasing diameter) as the blower tube 150 extends toward the outlet 156. Thus, a largest diameter of the blower tube 150 may be provided at the point of the blower tube 150 that is closest to the motor 120.

In an example embodiment, the inlet portion 154 may include an inlet assembly 160 that may include an inlet aperture 162 formed as an opening into the housing 110. The inlet aperture 162 may be circular, oval or any other suitable shape and may be provided at an angle so that it faces substantially downward and rearward. All air entering the blower 100 passes into a portion of the housing 110 via the inlet aperture 162. The inlet aperture 162 may be defined by a perimeter of an opening in the housing 110. The perimeter of the inlet aperture 162 may lie in a plane that is provided at an angle relative to blower tube axis 152. In some cases, an approximate center of the inlet aperture 162 may be aligned with the blower tube axis 152.

The inlet assembly 160 may further include an inlet mesh 164 that may be inwardly displaced from the inlet aperture 162. The inlet mesh 164 may include a plurality of louvers, vanes, guide holes or other such orifices/apertures arranged to allow air into the housing 110 to enable air to enter into the blower tube 150 responsive to operation of the motor 120 to be expelled via the outlet 156. In this regard, the operation of the motor 120 may cause an impeller or fan assembly 170 to rotate so that a low pressure area is generated to draw air into the inlet portion 154 through the inlet mesh 164 to be passed through the fan assembly 170 and expelled from the blower tube 150 at the outlet 156 to blow leaves, debris, or any other material.

In some cases, as shown in FIG. 3, the motor 120 and the fan assembly 170 may each be coaxial with the blower tube axis 152, so that air exiting the fan assembly 160 is generally moved (although such flow may be turbulent) along a direction substantially parallel to the blower tube axis 152. Air entering into the inlet portion 154 may be generally drawn into the inlet mesh 164 along the blower tube axis 152 as well. However, as shown in FIGS. 1 and 3 in particular, the inlet mesh 164 may be inset within the housing 110. In other words, the inlet mesh 164 may be disposed inward of the inlet aperture 162, spaced apart from the inlet aperture 162 such that the louvers, vanes, guide holes or other such orifices/apertures of the inlet mesh 164 are essentially inside the housing 110. Flow noise generated by airflow over the inlet mesh 164 may therefore be muted inside the housing 110 or, directed out the inlet aperture 162. Since the inlet aperture 162 is pointed downward and rearward, any noise emanating from the inlet mesh 164 may be directed at an angle relative to the blower tube axis 152. More specifically, any such noise may be directed downward and rearward away from the operator's ears and toward the ground.

In an example embodiment, the inlet mesh 164 may have a substantially conical shape, and all portions of such conical shape may be located within the housing 110. In some cases, the conical portion of the inlet mesh 164 may have a changing slope while extending from a first end of the inlet mesh 164 (e.g., the end proximate to the inlet aperture 162) to a second end of the inlet mesh 164 (e.g., the end proximate to the motor 120 and/or the fan assembly 170). The changing slope may be formed by decreasing the diameter of the inlet mesh 164 as the second end is approached. The diameter may decrease to substantially a point or apex at the second end. In an example embodiment, a rate of decrease in diameter may increase as distance to the second end decreases.

In some embodiments, the inlet mesh 164 may be inwardly displaced, or inset, within the housing 110 such that the first end of the inlet mesh 164 is spaced apart from the bottom edge of the perimeter of the inlet aperture 162 by a distance (d). The distance (d) may be greater than about 30 mm. Accordingly, an angle (a) may be formed between the bottom portion of the inlet mesh 164 at the first end thereof and a top portion of the perimeter of the inlet aperture 162 as shown in FIG. 3. The inlet mesh 164 may be formed by a series of substantially circular members 180 that have decreasing diameters as shown in FIG. 2. The circular members 180 may form louvers or apertures and may be connected by connectors 182 that extend in the direction of extension of the blower tube 150. However, in some cases, as shown for example in FIG. 3, the circular members 180' may instead form a spiral helix that tapers at the second end.

In some cases, the inlet mesh 164 may be provided in an inlet tube 200. The inlet tube 200 may have a diameter substantially equal to a largest diameter of the blower tube 150. The inlet tube 200 may extend toward the blower tube 150. In some cases, the motor 120 and the fan assembly 170 may be provided in the blower tube 150 or within an extension portion or outlet tube 210 having a diameter approximately equal to the diameter of the blower tube 150 and/or the inlet tube 200. The inlet tube 200 and the outlet tube 210 may extend toward each other and may even be generally aligned with each other. However, the inlet tube 200 and the outlet tube 210 may be spaced apart from each other by a distance of at least 10 mm. The provision of the inlet tube 200 and outlet tube 210 in a spaced apart relationship may facilitate the inclusion of an integrated muffler within the blower 100.

Figure 4:
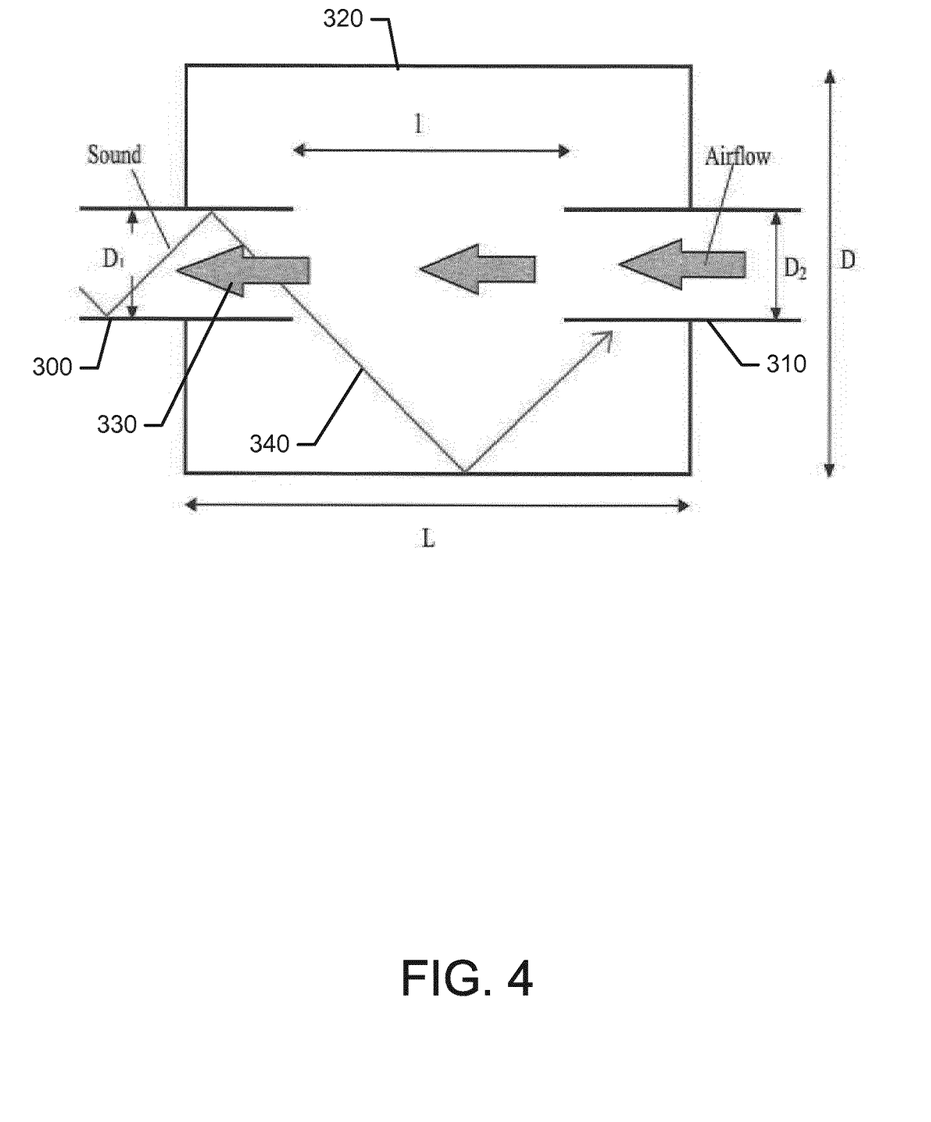
FIG. 4 illustrates a conceptual view of an integrated muffler assembly in accordance with an example embodiment.

The concept of an integrated muffler, from a functional perspective, can be explained in reference to FIG. 4. As shown in FIG. 4, an integrated muffler may include an outlet tube 300 having a diameter $D_1$ and an inlet tube 310 having a diameter $D_2$. $D_1$ and $D_2$ may be approximately equal. The inlet tube 310 and the outlet tube 300 may each extend partially into an acoustic chamber 320, but may be separated from each other by a distance (l). The distance (l) of separation may be less than the length (L) of the acoustic chamber 320. Furthermore, the acoustic chamber 320 may have a diameter (D) that is larger than the diameters ($D_1$ and $D_2$) of the outlet tube 300 and the inlet tube 310, respectively.

Air may move through the inlet tube 310 into the acoustic chamber 320 as shown by arrows 330. The air flowing through the acoustic chamber 320 and into the outlet tube 300 may not suffer any reduction in flow rate by virtue of the shape of the acoustic chamber 320. However, noise (indicated by arrow 340) may be deflected in the acoustic chamber 320 in such a way that at least some of the noise is muffled in the acoustic chamber 320 rather than escaping. The arrow 340 shows how some noise may not escape the acoustic chamber 320. This general structure can be duplicated within the housing 110.

Figure 5:
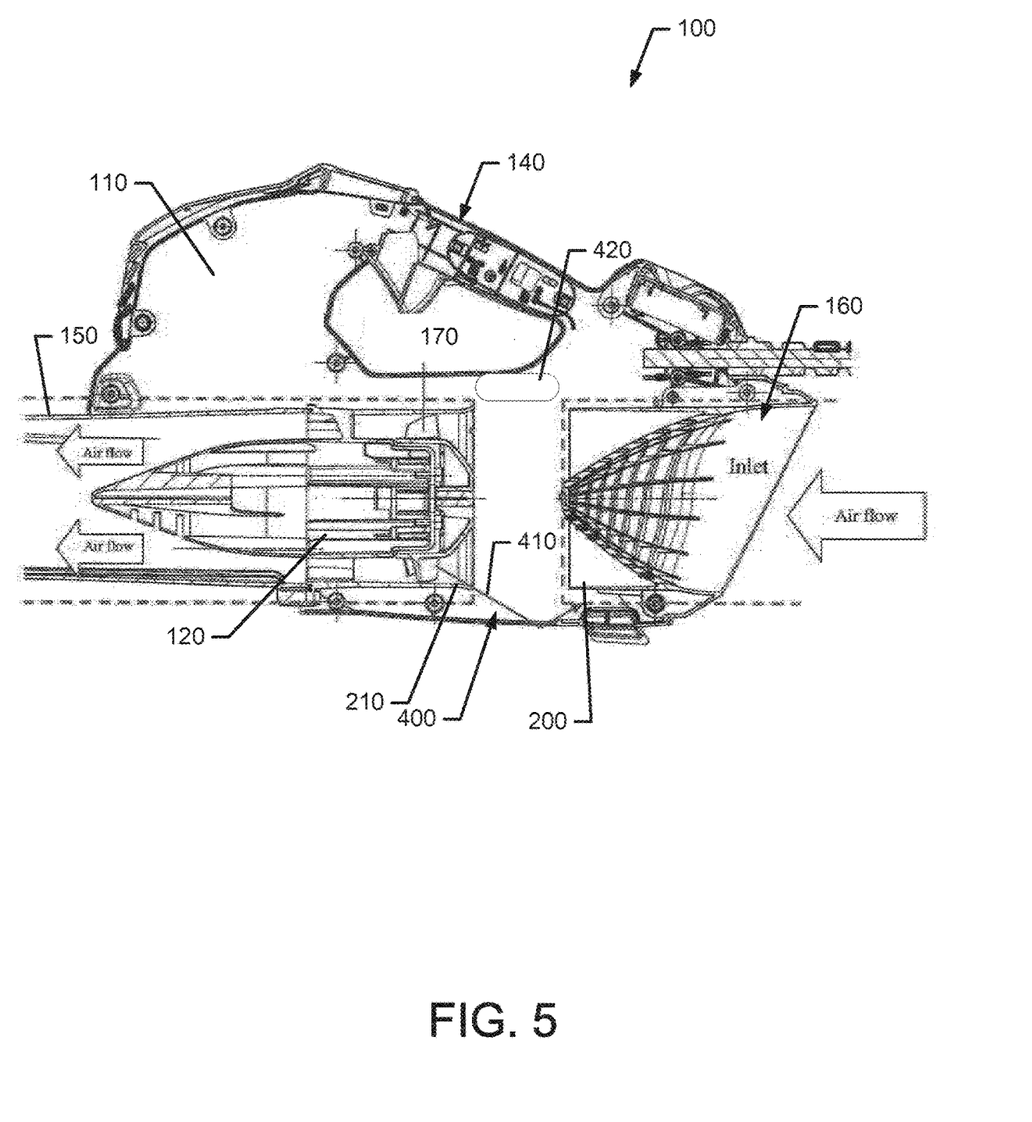
FIG. 5 illustrates a cross section view of an area of a blower in which the integrated muffler assembly may be provided in accordance with an example embodiment.

In this regard, as shown in FIG. 5, the inlet tube 200 and outlet tube 210 of the blower 100 may generally correlate to the inlet tube 310 and outlet tube 300 of FIG. 4, respectively. The housing 110 may define a cavity or acoustic chamber 400 in the space between the inlet tube 200 and the outlet tube 210. The acoustic chamber 400 may extend around the proximal ends of the inlet tube 200 and the outlet tube 210 as well, such that the inlet tube 200 and outlet tube 210 extend into the acoustic chamber 400. Airflow may pass through the inlet tube 200 to the outlet tube 210, through the fan assembly 170 and out the blower tube 150 without being substantially inhibited. However, noise (indicated by arrow 410) may experience a tortuous flow path in the acoustic chamber 400, and may be muffled therein. In this regard, the noise may bounce multiple times within the acoustic chamber 400 and may not have an efficient path outside of the acoustic chamber 400. Thus, the acoustic chamber 400 may act as an integrated muffler for the blower 100, insofar as the housing 110 may define a void space (i.e., the acoustic chamber 400) into which noise emanating from the fan assembly 170 or other internal components is captured or otherwise substantially internally retained to prevent or otherwise reduce the amount of noise that escapes from the blower 100. While some noise may still escape from the acoustic chamber 400, the amount of noise that escapes is substantially lower than the amount of noise generated in the first place. Moreover, if employed with the inlet assembly 160 described above, emanating noise is generally directed downward to ensure that less noise is noticeable to the operator or to any nearby persons who are not directly behind (and below) the blower 100.

Although not required, in some cases, the acoustic chamber 400 may further include an acoustic absorber 420 (e.g., foam, sponge, fibrous, or other acoustic absorbing materials). As such, the acoustic chamber 400 may be an open volume, or a volume that includes one or more acoustic absorbers 420 disposed therein. When acoustic absorbers 420 are employed, they may generally be placed outside of the flow path between the inlet tube 200 and the outlet tube 210. As such, for example, the acoustic absorbers 420 may be placed along outer walls of the acoustic chamber 400 (which may correspond to inner walls of the housing 110 at a portion of the housing 110 that is substantially below the handle 140). The acoustic absorbers 420 may provide a lining for substantially all of the interior portions of the housing 110 that correlate to the acoustic chamber 400, or they may be placed in discrete locations selected to reduce sound emissions while avoiding any degrading effects on flow rate through the blower 100.

Although the inlet tube 200 and the outlet tube 210 may be considered generally to have the same diameters, it may be appreciated that the fan assembly 170 and the inlet mesh 164 (if employed) of the inlet assembly 160 may actually create smaller discrete flow paths with various different effective geometries or diameters. These effective geometries or diameters may not necessarily be equivalent, but they will not alter the effectiveness or operation of the integrated muffler that is provided by the acoustic chamber 400. Instead, the noise generated into the acoustic chamber 400 is still effectively muffled, muted or reduced by the acoustic chamber 400 even if the sizes of the inlet and outlet are not matched.

As may be appreciated from FIGS. 1-5, air entering into the blower 100 enters via a downward and rearward facing aperture (i.e., the inlet aperture 162). Moreover, the inlet mesh 164 is substantially inside the housing 110 so that flow noise generally exits the inlet assembly 160 via the inlet aperture 162 to be directed downward and rearward and away from the operator's ears. Meanwhile, any noise generated by the fan assembly 170 and/or motor 120 that may be projected rearward toward the inlet portion 154 may enter into the acoustic chamber 400 where the space between the inlet tube 200 and outlet tube 210 may allow some such noise to be muffled in the larger volume of the acoustic chamber 400. Noise escaping may still be generally directed downward by the shape and structure of the inlet assembly 160 as described above.

A blower of an example embodiment may therefore include a housing, a motor, a fan assembly and an inlet assembly. The housing may include a handle operably coupled thereto. The fan assembly may be operably coupled to the motor to force air through a blower tube responsive to operation of the motor. The blower tube may define a tube axis. The inlet assembly may provide a path for air to the fan assembly. The inlet assembly may include an inlet aperture formed at an end of the housing. The inlet assembly may further include an inlet mesh disposed within the housing spaced apart from the inlet aperture.

The blower of some embodiments may include additional features that may be optionally added either alone or in combination with each other. For example, in some embodiments, (1) the inlet aperture may be defined by a perimeter lying in a plane at an angle relative to the tube axis. In some cases, (2) the plane may be angled to face downward and rearward responsive to the handle being grasped by an operator. In an example embodiment, (3) the inlet mesh may have a first end proximate to the inlet aperture and a second end distally located relative to the inlet aperture. A diameter of the inlet mesh may decrease from the first end to the second end. In some examples, (4) a rate of diameter decrease of the inlet mesh may increase as distance to the second end decreases. In some embodiments, (5) the inlet mesh has a substantially conical shape where, for example, all portions of the conical shape may be disposed inside the housing. In some cases, (6) an angle between the tube axis and a line extending from a top of the perimeter of the inlet aperture to a bottom of the second end of the inlet mesh may be about sixty degrees or less. In some examples, (7) the inlet mesh may include a spiral helix that tapers to the second end. In an example embodiment, (8) the inlet mesh may include a plurality of circular members each having decreasing diameters as the second end is approached. The circular members may be connected to each other via connectors extending in a direction of extension of the blower tube.

In some embodiments, any or all of (1) to (8) may be employed in addition to the optional modifications or augmentations described below. For example, in some embodiments, a distance between the inlet mesh and the inlet aperture may be at least about 30 mm. Additionally or alternatively, the motor may be an electric motor powered via a battery or mains power.

A blower of another example embodiment may therefore include a housing, a motor, and a fan assembly. The housing may include a handle operably coupled thereto. The fan assembly may be operably coupled to the motor to force air through a blower tube responsive to operation of the motor. The blower tube may define a tube axis. The fan assembly may be provided in an outlet tube corresponding to the blower tube, and air may be fed to the fan assembly via an inlet tube spaced apart from the outlet tube such that the outlet tube and inlet tube are operably coupled to each other via an acoustic chamber defined by the housing.

The blower of some embodiments may include additional features that may be optionally added either alone or in combination with each other. For example, in some embodiments, (1) a diameter of the acoustic chamber may be greater than a diameter of the inlet tube and a diameter of the outlet tube. In some cases, (2) the diameter of the inlet tube and the diameter of the outlet tube are approximately equal. In an example embodiment, (3) a distance between the inlet tube and the outlet tube may be less than a length of the acoustic chamber along the tube axis. In some examples, (4) the distance between the inlet tube and the outlet tube may be greater than about 10 mm. In some embodiments, (5) a longitudinal axis of each of the inlet tube and the outlet tube is substantially aligned with the tube axis.

In some embodiments, any or all of (1) to (5) may be employed in addition to the optional modifications or augmentations described below. For example, in some embodiments, the acoustic chamber may be disposed at a portion of the housing that is below the handle. Alternatively or additionally, the acoustic chamber may be a free space, or may include one or more acoustic absorbers provided therein. Additionally or alternatively, the motor may be an electric motor powered via a battery or mains power.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A blower comprising:
a housing including a handle operably coupled thereto;
a motor;
a blower tube defining a tube axis;
a fan assembly operably coupled to the motor to force air through the blower tube responsive to operation of the motor; and
an inlet portion at a rear of the blower rearward of the motor, the inlet portion including an inlet assembly providing a path for air to the fan assembly,
wherein the inlet assembly comprises an inlet aperture formed as an opening into the housing, and
wherein the inlet assembly further comprises an inlet mesh disposed within the housing spaced apart from the inlet aperture.

2. The blower of claim 1, wherein the inlet aperture is defined by a perimeter lying in a plane at an angle relative to the tube axis.

3. The blower of claim 2, wherein the plane is angled to face downward and rearward responsive to the handle being grasped by an operator.

4. The blower of claim 1, wherein the inlet mesh has a first end proximate to the inlet aperture and a second end distally located relative to the inlet aperture, and wherein a diameter of the inlet mesh decreases from the first end to the second end.

5. The blower of claim 4, wherein a rate of diameter decrease of the inlet mesh increases as distance to the second end decreases.

6. The blower of claim 4, wherein the inlet mesh has a substantially conical shape.

7. The blower of claim 6, wherein all portions of the conical shape are disposed inside the housing.

8. The blower of claim 4, wherein an angle between the tube axis and a line extending from a top of the perimeter of the inlet aperture to a bottom of the second end of the inlet mesh is about sixty degrees or less.

9. The blower of claim 4, wherein the inlet mesh comprises a spiral helix that tapers to the second end.

10. The blower of claim 4, wherein the inlet mesh comprises a plurality of circular members each having decreasing diameters as the second end is approached, the circular members being connected to each other via connectors extending in a direction of extension of the blower tube.

11. The blower of claim 1, wherein a distance between the inlet mesh and the inlet aperture is at least about 30 mm.

12. The blower of claim 1, wherein the motor comprises an electric motor powered via a battery or mains power.

13. A blower comprising:
a housing including a handle operably coupled thereto;
a motor; and
a fan assembly operably coupled to the motor to force air through a blower tube responsive to operation of the motor, the blower tube defining a tube axis;
wherein the fan assembly is provided in an outlet tube corresponding to the blower tube, and air is fed to the fan assembly via an inlet tube spaced apart from the outlet tube such that the outlet tube and inlet tube are operably coupled to each other via an acoustic chamber defined by the housing.

14. The blower of claim 13, wherein a diameter of the acoustic chamber is greater than a diameter of the inlet tube and a diameter of the outlet tube.

15. The blower of claim 14, wherein the diameter of the inlet tube and the diameter of the outlet tube are approximately equal.

16. The blower of claim 13, wherein a distance between the inlet tube and the outlet tube is less than a length of the acoustic chamber along the tube axis.

17. The blower of claim 16, wherein the distance between the inlet tube and the outlet tube is greater than about 10 mm.

18. The blower of claim 13, wherein a longitudinal axis of each of the inlet tube and the outlet tube is substantially aligned with the tube axis.

19. The blower of claim 13, wherein the acoustic chamber is disposed at a portion of the housing that is below the handle (140).

20. The blower of claim 13, wherein the acoustic chamber comprises a free space, or wherein the acoustic chamber includes one or more acoustic absorbers disposed therein.

* * * * *